(12) United States Patent
Heinonen et al.

(10) Patent No.: US 6,990,316 B2
(45) Date of Patent: Jan. 24, 2006

(54) SHORT RANGE RF NETWORK CONFIGURATION

(75) Inventors: Tomi Heinonen, Tampere (FI); Mikko Rautiainen, Tampere (FI); Jarkko Lempiö, Tampere (FI)

(73) Assignee: Nokia Corporation, Espoo (FI)

( * ) Notice: Subject to any disclaimer, the term of this patent is extended or adjusted under 35 U.S.C. 154(b) by 781 days.

(21) Appl. No.: 09/891,368

(22) Filed: Jun. 26, 2001

(65) Prior Publication Data

US 2003/0096577 A1   May 22, 2003

(51) Int. Cl.
*H04B 7/00* (2006.01)

(52) U.S. Cl. .................. 455/41.2; 455/422.1; 455/427
(58) Field of Classification Search ................. 455/39, 455/41.2, 422.1, 427, 428, 445, 500, 502
See application file for complete search history.

(56) References Cited

U.S. PATENT DOCUMENTS

| | | | |
|---|---|---|---|
| 5,673,031 A | 9/1997 | Meier | 340/825.08 |
| 5,812,531 A * | 9/1998 | Cheung et al. | 370/255 |
| 6,006,090 A | 12/1999 | Coleman et al. | 455/432 |
| 6,046,992 A | 4/2000 | Meier et al. | 370/338 |
| 6,704,283 B1 * | 3/2004 | Stiller et al. | 370/238 |
| 6,711,411 B1 * | 3/2004 | Ruffini | 455/502 |
| 6,744,740 B2 * | 6/2004 | Chen | 370/255 |
| 6,792,323 B2 * | 9/2004 | Krzyzanowski et al. | 700/90 |
| 6,795,688 B1 * | 9/2004 | Plasson et al. | 455/41.2 |
| 6,829,222 B2 * | 12/2004 | Amis et al. | 370/238 |
| 6,829,481 B2 * | 12/2004 | Souissi | 455/436 |

FOREIGN PATENT DOCUMENTS

| | | |
|---|---|---|
| JP | 11-272997 | 3/1998 |
| WO | 94/15413 | 7/1994 |
| WO | 98/17032 | 4/1998 |
| WO | WO 98/19400 | 5/1998 |
| WO | 98/27694 | 6/1998 |
| WO | 98/35453 | 8/1998 |
| WO | 99/21095 | 4/1999 |
| WO | 00/18025 | 3/2000 |
| WO | WO 00/69186 | 11/2000 |
| WO | WO 01/13660 A1 | 2/2001 |
| WO | WO 01/28156 A2 | 4/2001 |
| WO | WO 01/28157 A2 | 4/2001 |
| WO | WO 01/43362 | 6/2001 |
| WO | WO 01/43371 | 6/2001 |
| WO | WO 01/43372 | 6/2001 |

* cited by examiner

*Primary Examiner*—Bing Q. Bui
(74) *Attorney, Agent, or Firm*—Cohen, Pontani, Lieberman & Pavane (57) ABSTRACT

An RF network with a host node and a plurality of satellite nodes for communicating data from terminal devices connected to the nodes. Each node includes a transceiver with a unique address. On start-up of the network, the transceivers send inquiries; transceivers receiving an inquiry respond by sending their unique address; the inquiry sending transceiver stores the received addresses. All transceivers store the unique addresses of "neighboring" transceivers within their range (including those not to be part of the network). The unique transceiver addresses to be in the network are stored in the host node. The host node pages its neighbors which are to be in the network; those neighbors become initialized by learning the unique address of the host node, and report the addresses of their neighbors; each reporting node pages its neighbors; the process is repeated until all nodes intended to part of the network are initialized.

68 Claims, 6 Drawing Sheets

SHORT RANGE RF NETWORK CONFIGURATION

CROSS-REFERENCE TO RELATED APPLICATIONS

This application is related to U.S. patent application Ser. No. 09/781,190, filed Feb. 13, 2001.

BACKGROUND OF THE INVENTION

1. Field of the Invention

The present invention relates to short-range RF networks and, more particularly, to dynamic configuration of nodes in short range RF networks.

2. Description of the Related Art

The availability of various types of communication devices produces a need to have these devices interact with each other in a manner which is cost efficient and which can be easily implemented. Such communication can occur between two or more terminal devices (e.g. telephones, computers, printers, facsimile machines, personal digital assistants (PDAs), etc.) by wired connection such as by connecting electrical conductors to the devices, or by wireless communication using infrared signals or wireless frequency (RF) signals. For many applications, RF signals are preferred as they do not require line-of-sight interaction between a transmitter and a receiver of a terminal device pair.

Recently, low power RF systems have been proposed for providing communications between a plurality of transceivers through a short range link having a broadcast range of several meters. One such local RF system is currently under development and is referred to as "Bluetooth". This system will be commercially available in the near future and is designed to operate in the open spectrum, (around 2.45 gigahertz). This unlicensed radio band, known as Industrial-Scientific-Medical (ISM) is globally available. The operating range of this RF system is approximately 10 meters for a normal power mode and has proven to be economically efficient. Depending on the available bandwidth in a country (in parts of Europe and the U.S., a bandwidth of 83.5 MHz. is available, which is wider than the available bandwidth in Japan, Spain, and France) either 79 or 23 RF channels are used, the channel separation being 1 MHz. The channel is represented by a pseudo-random hopping sequence through the 79 or 23 RF channels. The hopping is unique in a small area, called a piconet. One of the Bluetooth devices in a piconet functions as master and the others as slaves.

Each channel is further divided into time slots, each 625 microseconds in duration, during which packets can be transmitted by the master and by the slaves. It is planned that Bluetooth chips having the described characteristics will be installed in various kinds of electronic devices for enabling communication among the separate devices. The Bluetooth system will allow for devices such as mobile phones, computers, and other types of terminal devices which are located within an operable range of the RF system to communicate with each other.

Wireless relay networks also exist which, in effect, extend an operating range of a local RF system by utilizing relay devices to interface with and provide communication between two or more terminal devices. Such a network is disclosed in PCT Application No. WO 98/17032 wherein a plurality of communication nodes are wirelessly connected to each other and to a host device for providing numerous communication links for data to be communicated between the host and terminal devices interfaced with the nodes. A drawback of such a system, however, is that it requires manual entry of configuration information when the complement of relay devices is established or altered. This typically requires the presence of a technically trained person. Another drawback of such a system is that a foreign relay device can insinuate itself into a network.

Related U.S. patent application Ser. No. 09/781,190 provides a system comprising a plurality of nodes with the ability to relay from one to another, and provides some automation of network setup. Setting up the network requires every node to page all other nodes, even nodes not within a given node's range, a somewhat complicated procedure. Each node receives a database of information pertaining to all nodes in the network, regardless of whether in range. This is not desirable since databases have proven to be a major source of system problems, and because distributing the node information is a potential security risk. The databases are volatile, so loss of power to a node (as when disconnecting it in order to relocate it, or during a general power failure) requires complete re-initialization.

SUMMARY OF THE INVENTION

To overcome limitations in the prior art described above, and to overcome other limitations that will be apparent upon reading and understanding the present specification, the present invention is directed to a short range RF network having routing capabilities for communicating data between one or more terminal devices and/or one or more hosts among a select one of a plurality of communication paths. The inventive network includes a plurality of satellite nodes and at least one host node, each node equipped with a transceiver having a unique address. When the network is first powered on, each node learns the unique address of its "neighbors", i.e., node transceivers within its range, by broadcasting inquiry messages. Transceivers which receive inquiry messages return their unique addresses. Neighbors may include "foreign" transceivers that are not intended to be part of the network. Then, the unique addresses of transceivers intended to be in the network are loaded into the host node. The host node pages its neighbors which are intended to be part of the network; those neighbors become initialized by learning the unique address of the host node. They then report the addresses of their neighbors. Each reporting node is then instructed to page its neighbors in turn. The process is repeated until all nodes intended to be part of the network are initialized. Paging messages include passwords of paged transceivers. Should foreign transceivers page network transceivers, they will not be able to provide valid passwords and will be precluded from being recognized in the network.

One aspect of the invention provides a method of configuring a wireless RF network, the network comprising a plurality of network nodes for communicating with other nodes, each node of the wireless RF network having a controller unit, a data store and a unique identifier, the method comprising the steps of: a) selecting at least one of the plurality of nodes to serve as a control node of the wireless RF network; b) providing the at least one selected control node with a unique host ID stored in a host ID register accessible to said selected control node; c) periodically detecting other nodes within the coverage area of each respective node of the plurality of nodes by sending an inquiry message; d) periodically updating the data store of each respective node of the plurality of nodes with addresses of detected nodes received from responses to the inquiry message by said detected nodes; e) storing the unique identifier of each respective node prescribed to pertain to the wireless RF network accessible to the at least one control node of the wireless RF network; f) transmitting from the at least one control node of the wireless RF network a dynamic paging message addressed to each respective node located within the coverage area of the at least one control node according to step (d) and having the unique identifier stored accessible to the at least one control node according to step (e); g) updating the data store of each respective node receiving the dynamic paging message and returning relative information of the updated data store to the at least one control node of the wireless RF network from each respective node receiving the dynamic paging message; h) storing the received relative information of the updated data store accessible to the at least one control node of the wireless RF network; i) transmitting from the at least one control node of the wireless RF network a message to each respective node which returned the relative information of the updated data store, the message instructing said node to send the dynamic paging message addressed to each respective node matching predefined criteria; and j) repeating steps (g) to (i) until every node identified to the at least one control node according to step (e) has been paged.

Another aspect of the invention provides a method of configuring a wireless RF network, the network comprising a plurality of network nodes for communicating with other nodes, each node of the wireless RF network having a controller unit, a data store and a unique identifier, the method comprising the steps of: a) maintaining identification information including a unique identifier of each respective node of the plurality of nodes prescribed to pertain to the wireless RF network; b) periodically detecting other nodes within coverage area of each respective node of the plurality of nodes and updating the data store of the each respective node of the plurality of nodes with information received from the detected nodes; c) transmitting a dynamic paging message addressed to each respective node matching predefined criteria; d) storing relative information of the dynamic paging message within each respective node receiving the dynamic paging message and returning a response message to the dynamic paging message; e) repeating steps c) and d) until every node identified according to step a) has been paged.

Another aspect of the invention provides a method of routing information while maintaining configuration of a wireless RF network, the network comprising a plurality of network nodes for communicating with other nodes, each respective node having a controller unit, a data store and a unique identifier, the method comprising the steps of: a) periodically sending a current data load information and a hops-to-host count from each respective node of the wireless RF network to other nodes within the coverage area of said respective node of the wireless RF network; b) periodically updating the data store of the each respective node of the wireless RF network with the data load information and the hops-to-host count of other nodes within the coverage area of said respective node of the wireless RF network; c) selecting at least one path having least hops-to-host count for routing messages from a node to at least one control node of the wireless RF network; and d) if more than one path having least hops-to-host count exist, selecting from among them a path with least load for routing messages from the node to the at least one control node of the wireless RF network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
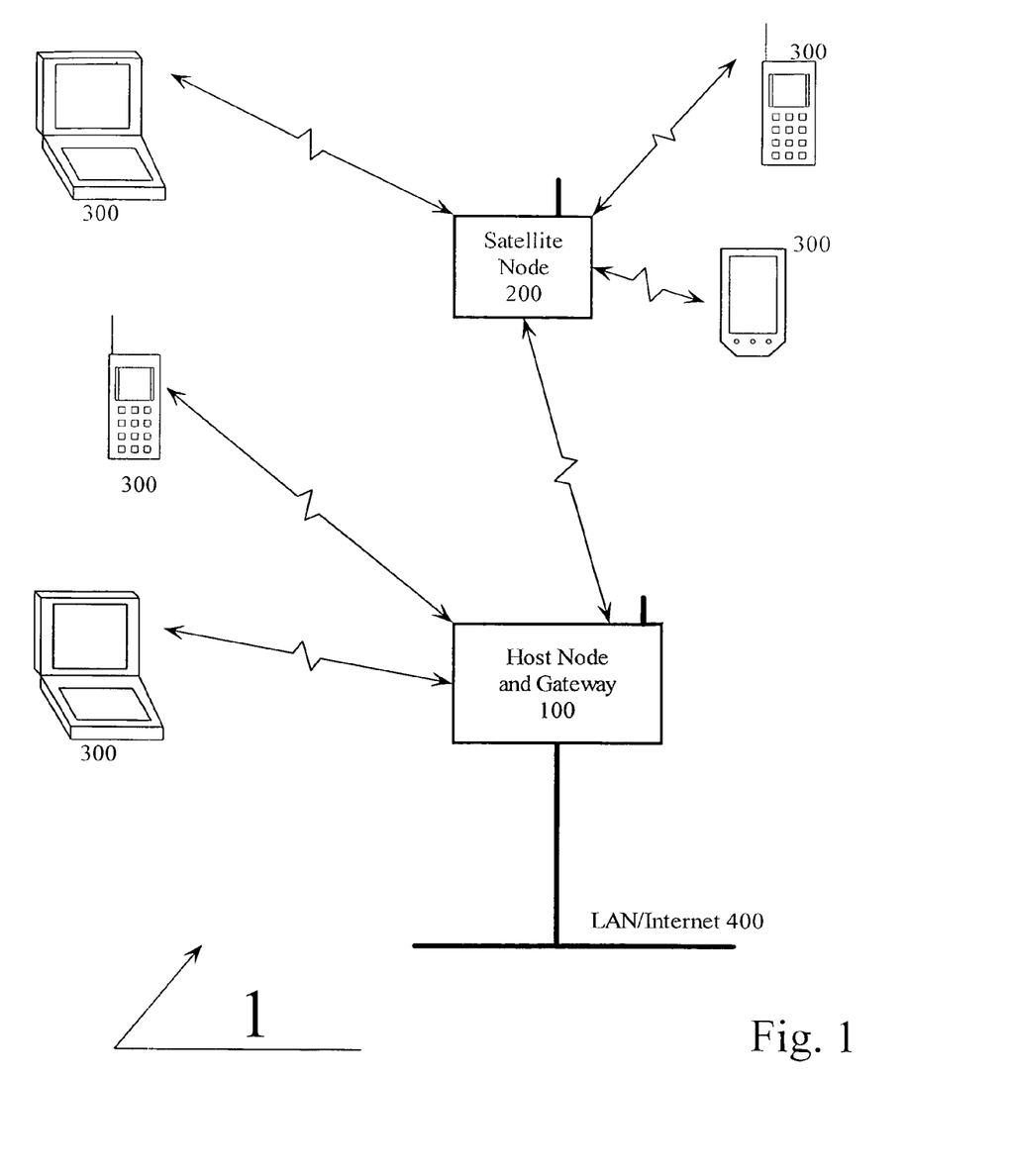
FIG. 1 is a generalized block diagram of one embodiment of a short-range RF network.

FIG. 1 shows generally one embodiment of a short-range RF network 1 in which the present invention may be practiced. Components of the network are equipped with short-range RF transceivers. In one embodiment of the present invention, these transceivers conform to the Bluetooth (BT) specification. The network includes a host node 100 (that may also have access to other networks 400), and typically a number of transceivers functioning as satellite nodes 200. The BT transceivers installed within the host node 100 and the satellite nodes 200 of the short-range RF network 1 typically have a range on the order of 30 meters or less, so, for coverage of a typical shopping center, a number of distributed satellite nodes are to be deployed. Terminals 300 are clients of the network, and include, without limitation, Bluetooth-equipped mobile telephones, Bluetooth-equipped palmtop devices, and Bluetooth-equipped portable computers. Terminals 300 can communicate among one another via the network, and with remote terminals (not shown) through host node 100 functioning as a gateway and then through LAN or Internet 400. An alternative embodiment of an RF network 1 may have several host nodes 100. When there are several hosts 100, some of them may not function as gateways to other networks. They may, however, serve as routers within the short-range RF network.

Figure 2:
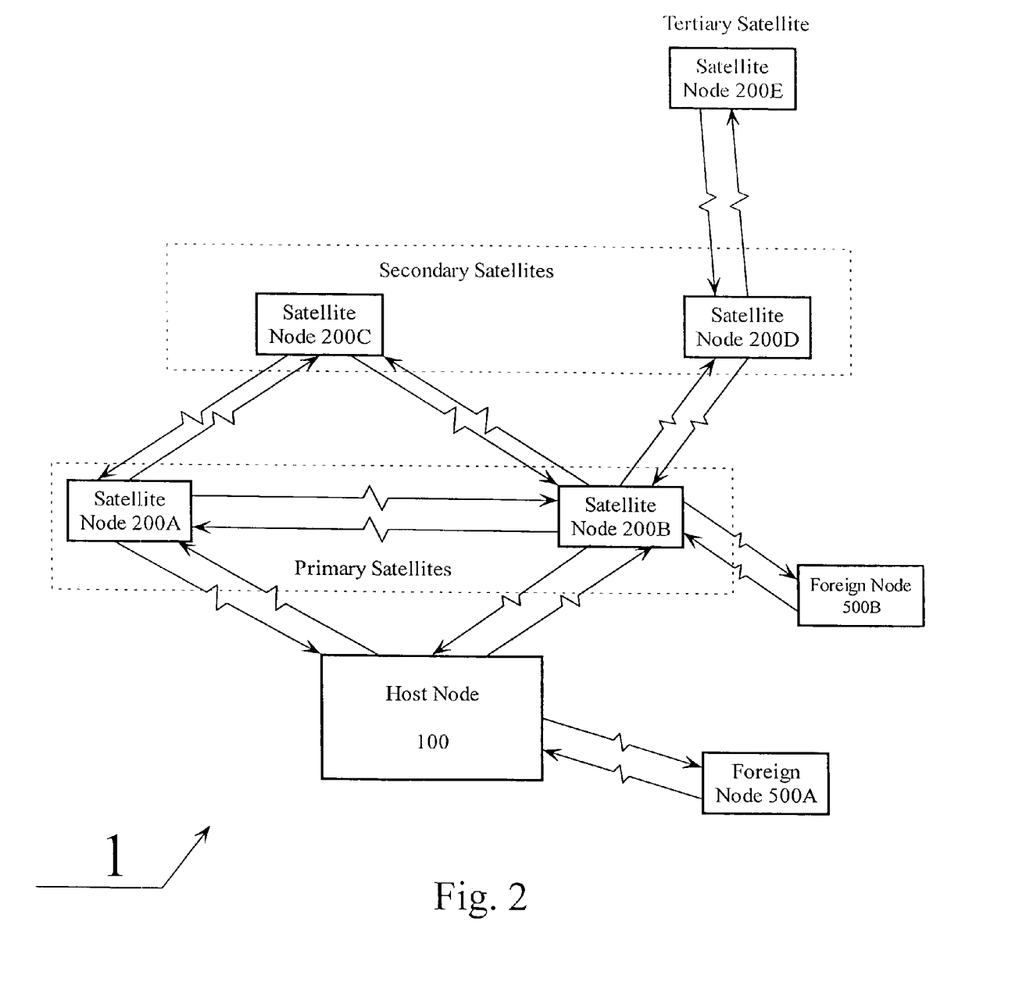
FIG. 2 shows the interrelationships of host and satellites in one embodiment of a typical short-range RF network.

FIG. 2 shows a typical deployment of one embodiment of a short-range RF network 1 comprising six network nodes: host node 100 and five satellite nodes 200, designated 200A, 200B, 200C, 200D, and 200E. Not all of the network nodes are within transmission range of all other nodes. Also, two "foreign" nodes 500A and 500B are within range of some of the network components, although it is not desired that they be part of the network 1. The RF links depicted as jagged lines with arrowheads in FIG. 2 indicate which devices are within each other's range. For example, satellite nodes 200A and 200B can directly contact each other, but 200A and 200D could contact each other only by relaying through intermediate nodes. For a satellite 200 to be part of the network it must be able to communicate with host node 100 either directly or with other satellite nodes as intermediates. For example, satellite 200E could communicate with host node 100 by relaying through satellite nodes 200D and 200B.

Figure 3:
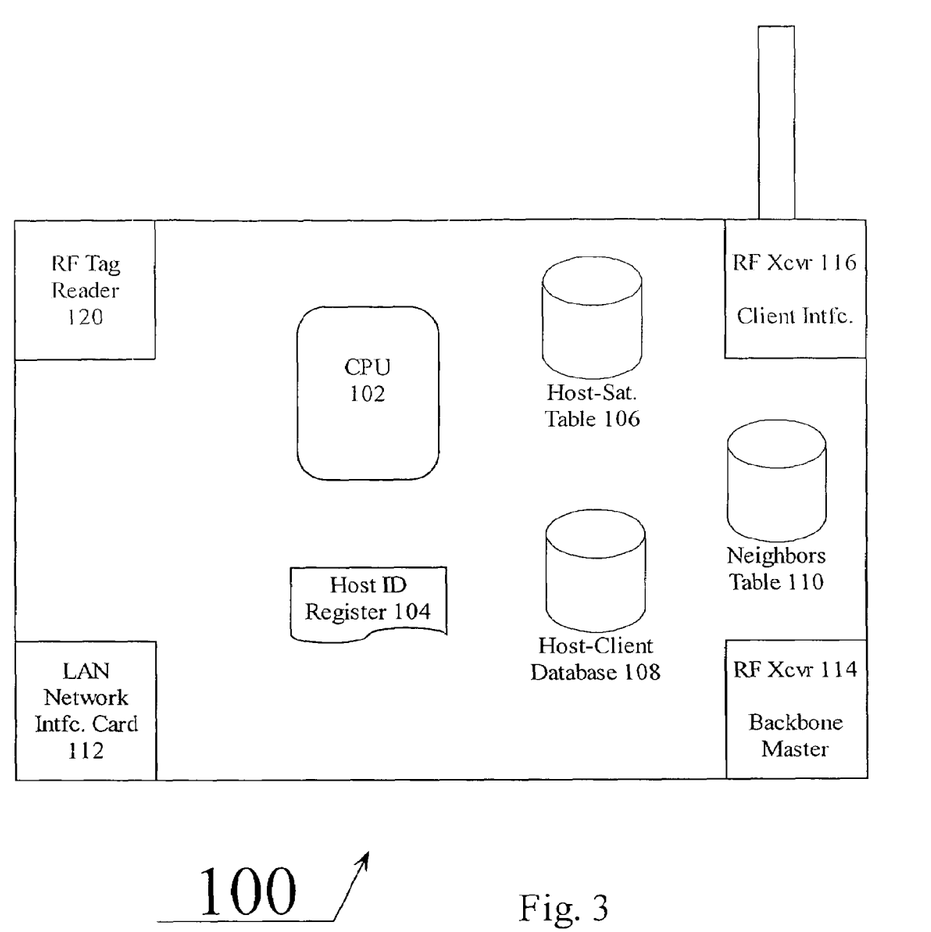
FIG. 3 is a block diagram of host for use in a short-range RF network according to one embodiment of the present invention.
Figure 4:
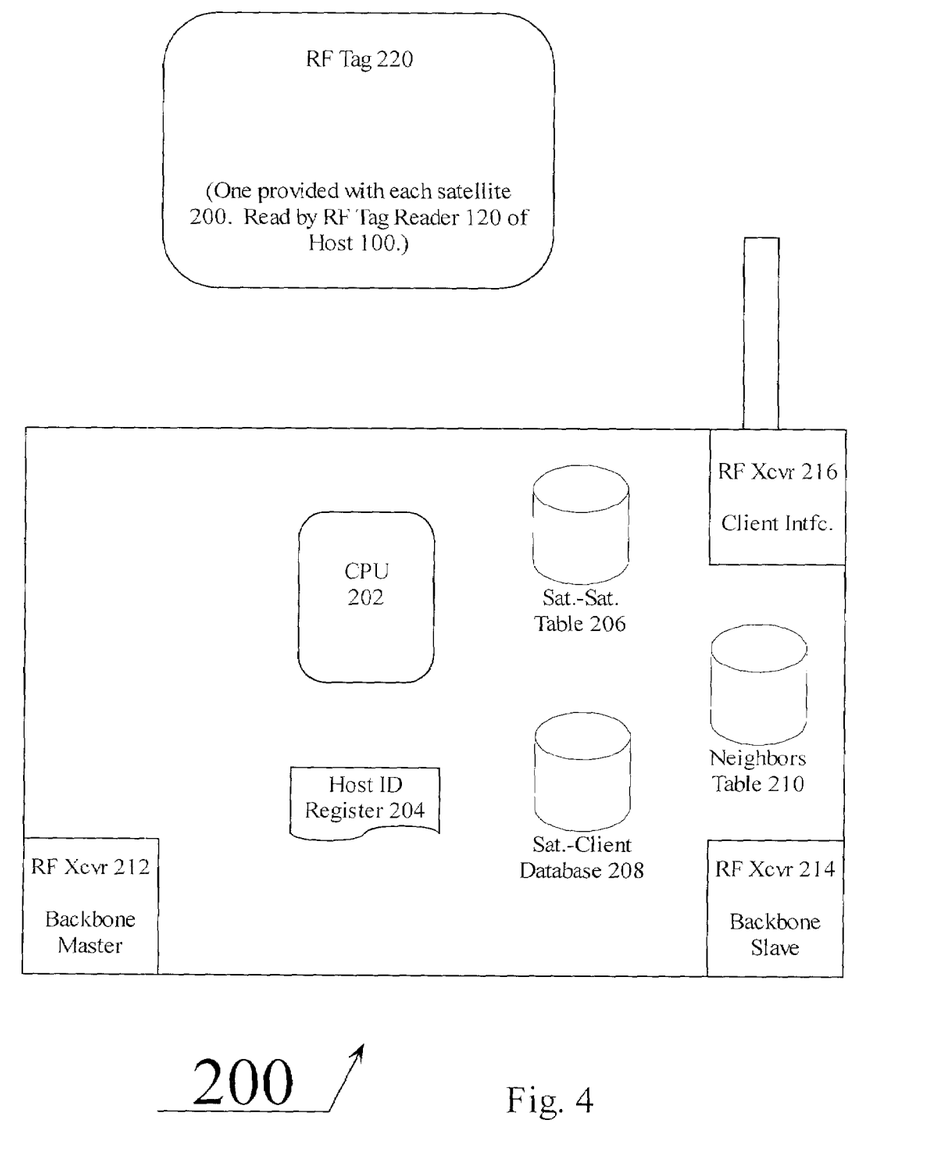
FIG. 4 is a block diagram of a satellite for use in a short-range RF network according to one embodiment of the present invention.

Referring to FIGS. 3 and 4, in one embodiment of the invention the host node 100 and each satellite 200 each have a client BT transceiver 116, 216 for communicating with clients 300 (not shown in FIGS. 2, 3, 4, 5, or 6). Each satellite 200 also has at least one network backbone BT transceiver. In the preferred embodiment, each satellite has two network backbone BT transceivers, one designated a master 212 and the other a slave 214. Host node 100 has but one network backbone BT transceiver 112, designated a master. Each transceiver has a unique Bluetooth address (BTAddr) and a unique Bluetooth password (BTPW).

In an alternative embodiment, a single transceiver may participate in two networks in a multiplex manner, sometimes functioning in one "piconet" and sometimes in the other. The composite of the two or more piconets is known as a "scatternet".

Transceiver 116 is included in a host node 100 as a client interface (CI) for communicating with user terminal devices. In an alternative embodiment, one or more of the network backbone transceivers (114 in host node 100, 212 or 214 in a satellite node 200) may function as the client interface using the previously mentioned multiplexing technique.

For purposes of the present example, foreign nodes 500A and 500B do not necessarily have all the components shown in FIGS. 3 and 4, but they each have at least a BT slave transceiver.

FIG. 3 shows that one embodiment of host node 100 also contains a CPU 102 and a host ID register 104. Every host has an ID unique from that of all other hosts. In a preferred embodiment, the host ID is the Bluetooth address (BTAddr) of host node 100's master transceiver 114. Host ID register 104 stores the ID permanently. Host node 100 also includes a host-satellite table 106 for keeping track of the network configuration and a neighbors table 110 for keeping track of satellite nodes within range (both discussed below) and a host-client database 108 for keeping track of clients 300 currently connected through host node 100. Host node 100 also includes interface card 112 for interfacing with a LAN or Internet 400 (shown in FIG. 1).

FIG. 4 shows that each satellite 200 in one embodiment also contains a CPU 202, and a host ID register 204. After the network is initialized, each node's host ID register 204 will contain the host ID obtained from host ID register 104 of host node 100. Host ID register 204 is a non-volatile register, which facilitates retaining network initialization even if power to a satellite 200 is interrupted. A satellite 200 also contains a satellite-satellite table 206 for keeping track of network configuration, and a neighbors table 210 for keeping track of satellite nodes within range (both discussed below) and satellite client database 208 for keeping track of clients 300 currently connected through the satellite 200.

In one embodiment, after the network components are mounted in the desired deployment, they are powered on. The network is not yet initialized. Each satellite determines that it is not yet initialized in a network based on its nonvolatile Host ID Register 204 being empty. Accordingly, the host and each satellite are programmed so as then to enter the inquiry mode provided in Section 10.7 of Volume 1 (Core) of the Bluetooth specification, version 1.1, for satellite nodes to discover which satellite nodes are within their range. (If Host ID Register 204 is not empty upon power-up, this indicates that an initialized satellite was powered off and powered on again, and possibly relocated in the interim. The network enters a reconnection mode, discussed below.) Transceiver 114 of host node 100 and master transceivers 212 of satellite nodes 200 send inquiry messages. The slave transceivers 214 of satellite nodes 200 respond to each inquiry message they receive by transmitting packets containing their BTAddrs. The host or any satellite nodes that receive responses store the BTAddrs contained in the response packets in their neighbors tables 110, 210.

Typically within several seconds, this procedure results in each network node's having in its neighbors table 110, 210 a list of all satellite nodes found by means of inquiry and thus within range. None of the neighbors tables 210 include an entry for host 100, even though some of the satellite nodes 200 are within range of the host 100. This is because host node 100 does not have a slave transceiver and this does not receive inquiry messages from satellite nodes 200. For the present exemplary deployment as illustrated in FIG. 2, the contents of the neighbors table 110 are shown in Table 1 (for the host) and the contents of neighbors tables 210A through 210E (for the five satellite nodes) are shown in Tables 2A through 2E. (In practice, the entries within the tables may occur in any order.) In the tables, BTAddr 200A-214 (for example) denotes "the Bluetooth address of slave chip 214 of satellite 200A".

TABLE 1

Neighbors Table 110
(Host node 100)

BTAddr 200A-214
BTAddr 200B-214
BTAddr 500A-214

TABLE 2A

Neighbors Table 210A
(Satellite 200A)

BTAddr 200B-214
BTAddr 200C-214

TABLE 2B

Neighbors Table 210B
(Satellite 200B)

BTAddr 200A-214
BTAddr 200C-214
BTAddr 200D-214
BTAddr 500B-214

TABLE 2C

Neighbors Table 210C
(Satellite 200C)

BTAddr 200A-214
BTAddr 200B-214

TABLE 2D

Neighbors Table 210D
(Satellite 200D)

BTAddr 200B-214
BTAddr 200E-214

TABLE 2E

Neighbors Table 210E
(Satellite 200E)

BTAddr 200D-214

In one embodiment of the invention, a machine readable tag 220 (shown in FIG. 4) is provided with each satellite 200. Incorporated into or connected to host node 100 (FIG. 3) is a tag reader 120, which reads the information contained on each tag 220. In one embodiment, tag 220 is encoded with the BTAddr and Bluetooth password (BTPW) of BT slave chip 214. In an alternative embodiment tag 220 might be encoded with the BTAddrs and BTPWs of slave chip 214 as well as of master chip 212. In another alternative embodiment, two tags 220 are associated with each satellite 200, one encoded with the BTAddr and BTPW of slave chip 212 and the other with those of master chip 214.

After powering on the network components (and thus implicitly initiating the inquiry procedure just described), an operator presents the tags 220A through 220E, from each of satellite nodes 200A through 200E respectively, to tag reader 120. The BTAddrs and BTPWs read from the tags are stored in host-satellite table 106, which then has contents as shown in Table 3. In alternative embodiments, the BTAddrs and BTPWs may be input to host-satellite table 106 through other means, such as through a LAN 400 from a terminal (not shown).

TABLE 3

Host-satellite
Table 106 after powering up and inputting BTAddrs & BTPWs

| Backbone Slave BTAddr | Backbone Slave BTPW | Status | Neighbors | Hops to Host | Load |
|---|---|---|---|---|---|
| 200D-214 | 200D-214 | Inactive | — | — | — |
| 200C-214 | 200C-214 | Inactive | — | — | — |
| 200A-214 | 200A-214 | Inactive | — | — | — |
| 200E-214 | 200E-214 | Inactive | — | — | — |
| 200B-214 | 200B-214 | Inactive | — | — | — |

The tags 220 might have been presented in any order, and thus the entries might have been stored in any order. The exemplary order shown in Table 3 is arbitrarily chosen. No tags are presented for the foreign nodes 500A and 500B. This implicitly informs the system that nodes 500A and 500B are indeed foreign and are not to be incorporated into the network 1. Table 3 contains a column headed "Load" which will not be used during initialization of the network, but is used after the network is in operation as will be discussed below.

An operator would then signal host node 100 to begin initializing the network. Host node 100 pages (using the paging facility defined in the satellite nodes that appear in host-satellite table 106 which are known to be within range of host node 100, as determined from neighbors table 110. In the present example, satellite nodes 210A and 210-B are paged by host node 100, the paging message being sent to them using their BTAddrs. The paging message to each satellite 200A and 200B includes the host ID obtained from Host ID register 104, and the number of "hops-to-host" for the satellite (a value of 1 for satellite nodes within range of host node 100). The validity of each satellite's BTPWs are verified, as by the "challenge-response" scheme given in Volume 2 (Profiles), Park K:1 of the Bluetooth Specification, version 1.1. In alternative embodiments, other methods of password verification may be used.

Each of the satellite nodes 200A and 200B, upon receiving the paging message, stores the host ID in its host ID register 204, thus recording that it is initialized in a network with the particular host node 100 having that host ID. Each of the satellite nodes 200A and 200B also reports back to host node 100 the BTAddrs of its neighbors, from the neighbors tables 210A and 210-B. Host node 100 stores that information in the "neighbors" column of host-satellite table 106 for all satellite nodes whose BTAddrs are recorded in host-satellite table 106 (i.e., not for any foreign satellite nodes). After satellite nodes 200A and 200B have reported back (and are thus known to be initialized), host node 100 updates host-satellite table 106 to the contents shown in Table 4.

TABLE 4

Host-satellite Table 106 after paging satellite nodes 200A and 200B

| Backbone Slave BTAddr | Backbone Slave BTPW | Status | Neighbors | Hops to Host | Load |
|---|---|---|---|---|---|
| 200D-214 | 200D-214 | Inactive | — | — | — |
| 200C-214 | 200C-214 | Inactive | — | — | — |
| 200A-214 | 200A-214 | Active | 200B-214 200C-214 | 1 | — |
| 200E-214 | 200E-214 | Inactive | — | — | — |
| 200B-214 | 200B-214 | Active | 200A-214 200C-214 200D-214 | 1 | — |

This completes initialization of satellite nodes 200A and 200B, which are marked "Active" by virtue of being initialized. Satellite nodes 200A and 200B are primary satellite nodes by virtue of being within range of host node 100. Primary satellite nodes will now initialize secondary satellite nodes (i.e., satellite nodes within range of primary satellite nodes but not within range of host node 100).

Host node 100 also passes satellite 200C's password to satellite 200A. Satellite 200A pages satellite 200C by its BTAddr. The paging message includes the contents of host ID register 204 and a hops-to-host number one greater than satellite 200A's own, i.e., 2.

Satellite 200C receives the paging message and verifies its BTPW. Satellite 200C then stores the host ID in its host ID register 204C. Satellite 200C reports back to satellite 200A that it is initialized, and that satellite 200B is another of its neighbors. Satellite 200A reports this back to host node 100. Satellite 200A updates its satellite-satellite table 206A as shown in Table 5A:

TABLE 5A

Satellite-Satellite Table 206A (satellite 200A) after paging satellite 200C

| Satellite BTAddr | Hops-to-Host | Load |
|---|---|---|
| (self) | 1 | — |
| 200B-214 | 1 | — |
| 200C-214 | 2 | — |

Based on the report sent back from satellite 200A, host node 100 updates its host-satellite table 106 as shown in Table 6.

TABLE 6

Host-satellite Table 106 after paging satellite 200C

| Backbone Slave BTAddr | Backbone Slave BTPW | Status | Neighbors | Hops To Host | Load |
|---|---|---|---|---|---|
| 200D-214 | 200D-214 | Inactive | — | — | — |
| 200C-214 | 200C-214 | Active | 200A-214 200B-214 | 2 | — |
| 200A-214 | 200A-214 | Active | 200B-214 200C-214 | 1 | — |
| 200E-214 | 200E-214 | Inactive | — | — | — |
| 200B-214 | 200B-214 | Active | 200A-214 200C-214 200D-214 | 1 | — |

Host node 100, upon being informed that satellite 200B is one of satellite 200C's neighbors, determines that this was already known from the initialization of satellite 200B, and passes a message to that effect to satellite 200C, which records its satellite-satellite table 206C as shown in Table 5C:

TABLE 5C

Satellite-Satellite table 206C (satellite 200C) after initializing satellite 200C

| Satellite BTAddr | Hops-to-Host | Load |
|---|---|---|
| (self) | 2 | — |
| 200A-214 | 1 | — |
| 200B-214 | 1 | — |

In further response to the initialization of satellite nodes 200A and 200B, in which host node 100 was informed that satellite 200B has among its neighbors satellite nodes 200A, 200C, and 200D, host node 100 informs satellite 200B that satellite nodes 200A and 200C are initialized and what their hops-to-host counts are. Satellite 200B incorporates this information into its satellite-satellite table 206-B. Host node 100 also informs satellite 200B of satellite 200D's password BTPW 200D-214. Satellite 200B pages satellite 200D by its BTAddr, including in its message the host ID from host ID register 204-B, and a hops-to-host count one greater than satellite 200B's own, i.e., 2. Satellite 200D, upon receiving the paging message and after verification of the BTPW, stores the host ID in its host ID register 204D, and reports back to satellite 200B that it is initialized, and that one of its neighbors is satellite 200E. Satellite 200B reports this information back to host node 100. Satellite 200B updates its satellite-satellite table 206-B as shown in Table 5B:

TABLE 5B

Satellite-Satellite Table 206-B
Satellite-Satellite Table 206B (satellite 200B) after paging satellite 200D

| Satellite BTAddr | Hops-to-Host | Load |
|---|---|---|
| (self) | 1 | — |
| 200A-214 | 1 | — |
| 200C-214 | 2 | — |
| 200D-214 | 2 | — |

Based on the report back from satellite 200B, host node 100 updates host-satellite table 106 as shown in Table 7:

TABLE 7

Host-satellite Table 106 after paging of satellite 200D

| Backbone Slave BTAddr | Backbone Slave BTPW | Status | Neighbors | Hops To Host | Load |
|---|---|---|---|---|---|
| 200D-214 | 200D-214 | Active | 200B-214 200E-214 | 2 | — |
| 200C-214 | 200C-214 | Active | 200A-214 200B-214 | 2 | — |
| 200A-214 | 200A-214 | Active | 200B-214 200C-214 | 1 | — |
| 200E-214 | 200E-214 | Inactive | — | — | — |
| 200B-214 | 200B-214 | Active | 200A-214 200C-214 200D-214 | 1 | — |

Host node 100 now passes a message to satellite 200D, relayed through satellite 200B, containing satellite 200E's BTPW. Satellite 200D pages satellite 200E, including in the paging message the host ID from host ID register 204D and a hops-to-host count one greater than satellite 204D's own, i.e., 3. After receipt of the message and verification of the BTPW, satellite 200E stores the host ID in host ID register 204E, and passes acknowledgement back to satellite 200D, which relays it back to host node 100 via satellite 200B. Satellite nodes 200D and 200E record their satellite-satellite tables 206D and 206E as shown in tables 5D and 5E respectively. Host node 100 updates its host-satellite table as shown in Table 8.

TABLE 5D

Satellite-Satellite Table 206D (satellite 200D) after paging of satellite 200E

| Satellite BTAddr | Hops-to-Host | Load |
|---|---|---|
| (self) | 2 | — |
| 200A-214 | 1 | — |
| 200B-214 | 1 | — |
| 200E-214 | 3 | — |

TABLE 5E

Satellite-Satellite Table 206E (satellite 200E) after paging satellite 200E

| Satellite BTAddr | Hops-to-Host | Load |
|---|---|---|
| (self) | 3 | — |
| 200D–214 | 2 | — |

TABLE 8

Host-satellite Table 106 after paging satellite 200E

| Backbone Slave BTAddr | Backbone Slave BTPW | Status | Neighbors | Hops To Host | Load |
|---|---|---|---|---|---|
| 200D-214 | 200D-214 | Active | 200B-214<br>200E-214 | 2 | — |
| 200C-214 | 200C-214 | Active | 200A-214<br>200B-214 | 2 | — |
| 200A-214 | 200A-214 | Active | 200B-214<br>200C-214 | 1 | — |
| 200E-214 | 200E-214 | Active | 200D-214 | 3 | — |
| 200B-214 | 200B-214 | Active | 200A-214<br>200C-214<br>200D-214 | 1 | — |

This completes initiation of the network of the present example, which includes primary, secondary, and tertiary satellite nodes. It will be readily understood that continued iteration of the procedure would initialize networks with any number of satellite levels.

The column headed "Load" is not used during initialization, and thus its contents are undefined. During operation, the satellite nodes periodically query their neighbors' number of hops-to-host and present load, communicating this information to each other and to the host. In a present embodiment, load is expressed as a decimal fraction in the range 0 to 1, where 1 denotes full load or saturation. The reported information is used to determine routing, according to two rules: i) a satellite always routes a data packet toward the host; and ii) if a satellite has a choice of two or more satellite nodes one hop closer to the host, it routes to the satellite with the lightest load.

For example, if a client 300 is transmitting a message to satellite 200B, which is one hop from the host node 100, the message is transmitted by satellite 200B to the host node 100 and not to any other satellite.

For another example, if a client 300 is transmitting a message to satellite 200D, and if satellite-satellite table 206D is as shown in Table 9,

TABLE 9

Example of loading in Satellite-Satellite Table 206D (satellite 200D)

| Satellite BTAddr | Hops-to-Host | Load |
|---|---|---|
| (self) | 2 | 0.6 |
| 200A-214 | 1 | 0.4 |
| 200B-214 | 1 | 0.7 |
| 200E-214 | 3 | 0.2 | then satellite 200D will route to satellite 200A, not to satellite 200E because satellite 200E is further from host node 100 as shown by its higher hops-to-host count, and not to satellite 200B because satellite 200B is seen to be more heavily loaded (0.7) than satellite 200A (0.4).

When host node 100 needs to route packets out through the satellite nodes, it first determines the route in reverse order. For example, if routing needs to be determined from host node 100 to satellite 200C, host node 100 uses the hops-to-host and load information in its host-satellite table 106 to determine what would be the best route from satellite 200C in to host node 100, and then routes the message over the reverse of that route.

The proprietor of the network may at times elect to relocate a satellite. For example, in an embodiment depicted in FIG. 5, satellite 200C of FIG. 2 is moved to a new location, at which it is denominated satellite 200CX to eliminate confusion with its former role. A first step is to disconnect satellite 200C from its power source, which renders satellite 200C inoperative. It will then not respond to load queries from its neighbors. When satellite 200C has gone a predetermined time without responding, it is removed from the satellite-satellite tables 206 of its former neighbors, and is marked as inactive in host-satellite table 106.

Figure 5:
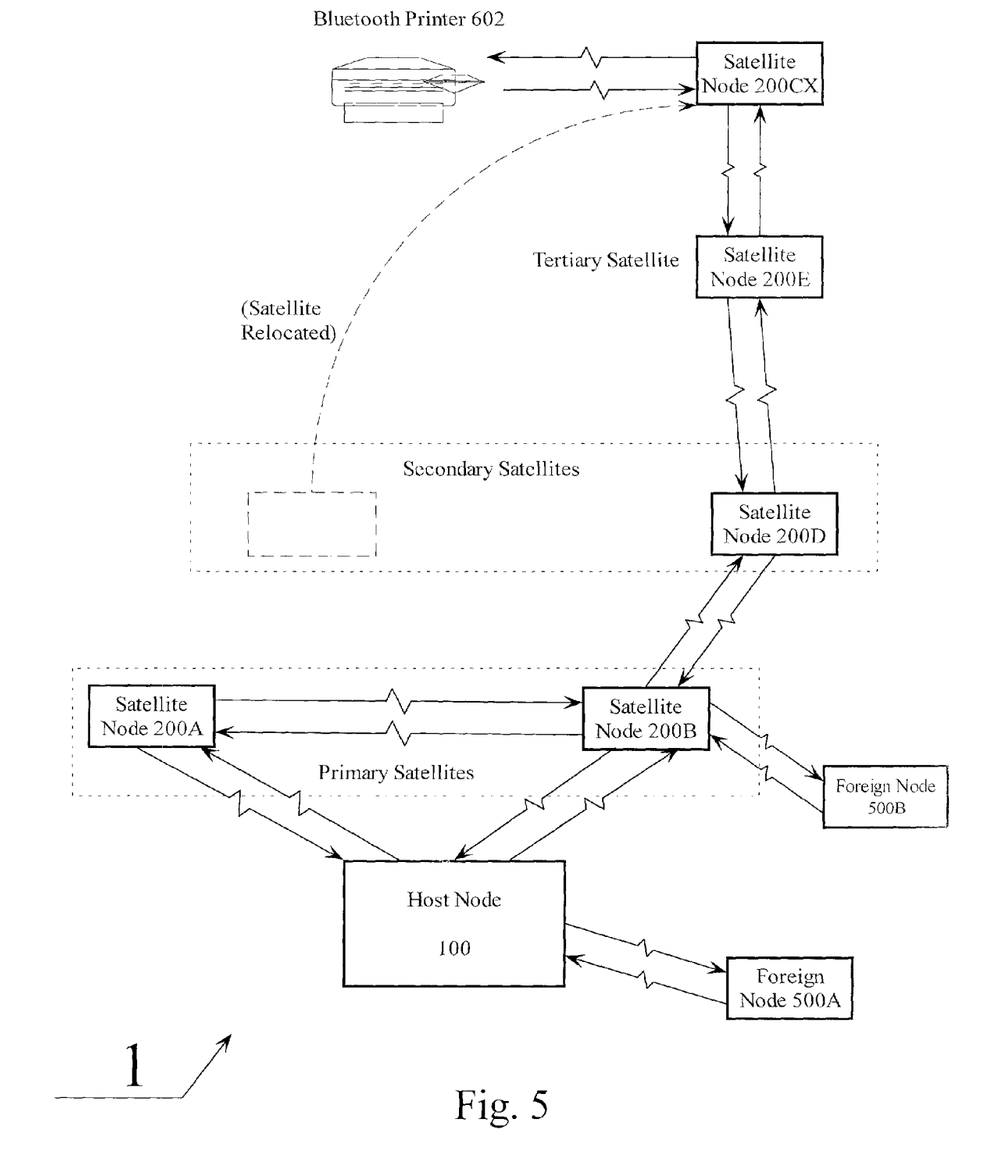
FIG. 5 shows the typical network of FIG. 2 after relocation of one of the satellites.

As an outcome of the initialization procedure described above, satellite 200C had the host ID of Host node 100 in its Host ID register 204. That is a nonvolatile register, so it still contains the host ID when it is relocated as satellite 200CX and reconnected to a power source, and accordingly satellite 200CX determines that it is an initiated satellite. Accordingly, upon being powered up again, satellite 200CX sends reconnection messages, rather than attempting the initialization procedure described above. A satellite attempts the initialization procedure only when its Host ID register 204 is empty. The reconnection messages are not paging messages under the BT paging protocol, but are service discovery protocol (SDP) messages as set forth in part E of the Bluetooth specification. The primary purpose of SDP messages is for a BT client (e.g., a laptop computer) to find some specific BT service (e.g., a Bluetooth printer or an Internet resource). SDP messages are used here for establishing reconnection to a satellite because at the conclusion of the initiation process described previously, the BT backbone transceivers were conditioned not to respond to BT paging messages. BT SDP messages are used instead, and they are received and answered by the BT client transceivers 116 and 216. In the example of FIG. 5, in which satellite 200E is the only satellite within range only of satellite 200CX, the reconnection SDP message from satellite 200CX is received by client transceiver 216E. Other Bluetooth transceivers not affiliated with the network 1 may also be within range of relocated satellite 200CX, such as Bluetooth printer 602 in the present example.

In the present example, a Bluetooth transceiver of relocated satellite 200CX sends an SDP request, which is received by Bluetooth client interface transceivers of satellite 200E and printer 602. Client interface transceiver 216E responds to the SDP request, while BT master and slave transceivers 212 and 214 were conditioned in the initialization procedure described above not to respond to such requests. The SDP request message contains the Bluetooth address of a transceiver in satellite 200CX. One of the primary purposes of client interface transceivers 216 is to permit client terminal devices to find various services, so transceiver 216E responds with its Bluetooth address and with a handle to the service available through it and via LAN 400. Bluetooth printer 602 responds with the BT address of its transceiver and with an empty handle list. Upon receiving the empty handle list, relocated satellite 200CX determines that Bluetooth printer 602 is not a part of the network with which reconnection is sought.

Relocated satellite then sends a reconnection message addressed to CI transceiver 216E in satellite 200E. The reconnection message contains the contents of relocated satellite 200CX's host ID register 204, and the BT address of its BT Slave transceiver 214. Responsive to the reconnection message, satellite 200E registers satellite 200CX in its tables, and reports its hops-to-host plus one and its load to satellite 200CX, which registers satellite 200E in its tables. Satellite 200CX then routes a message to host node

100 reporting its hops-to-host and its load. Relocated satellite 200CX is thus configured back into the network.

Figure 6A:
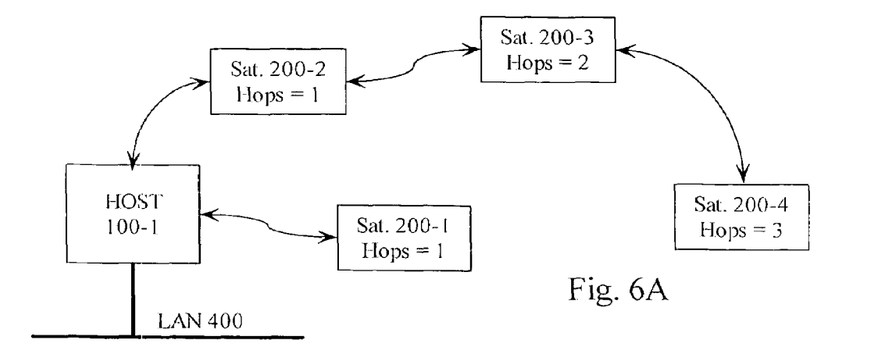
FIG. 6A is a block diagram of a short-range RF network.
Figure 6B:
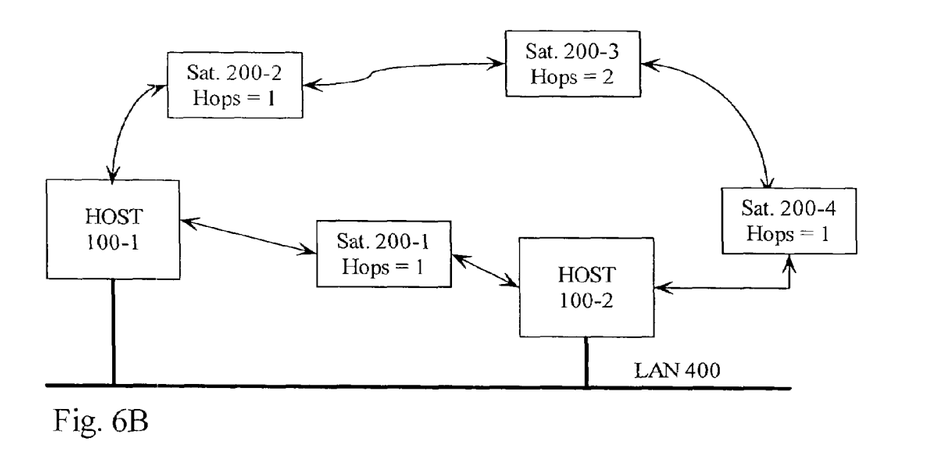
FIG. 6B illustrates reducing hops-to-host for some nodes of the network of FIG. 6A by introducing a new host.

In an embodiment of a short-range RF network, additional hosts may be introduced into the network so as to decrease the hops-to-host count for some of the satellites. FIG. 6A is a high-level block diagram of a network containing one host 100-1. Satellite 200-4 has a hop-to-host count of 3, since it must relay through two intermediate satellites 200-3 and 200-2 to communicate with host 100-1. FIG. 6B shows the introduction of Host 100-2, placed so as to be in range of satellites 200-1 and 200-4. After passing host 100-1's database contents to host 100-2 (e.g., via LAN 400) and reconfiguring the network by means of the procedures given above, satellite 200-4's hops-to-host count is reduced to 1. When data is to be passed to a satellite from LAN 400 (e.g., data from another network), hosts 100-1 and 100-2 coordinate with each other; one with a lower hops-to-host count to the satellite accepts the transmission and the other refuses it. If both hosts have an equal hops-to-host regarding the satellite, one host accepts the transmission and directs the other to refuse it. This determination can be according to load considerations among the satellites.

Figure 6C:
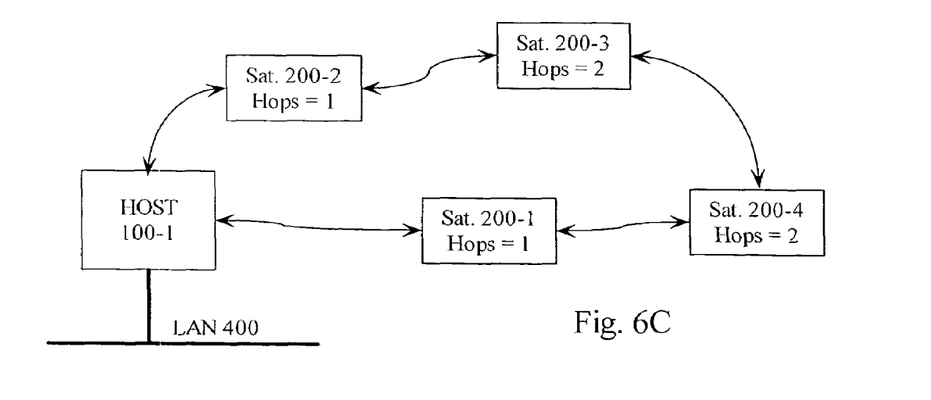
FIG. 6C illustrates reducing hops-to-host form some nodes of the network of FIG. 6A by repositioning other of the nodes.

In addition to adding new hosts, the addition of new satellites or the relocation of existing satellites can also reduce hops-to-host counts for some satellites. FIG. 6C shows reduction in satellite 200-4's hops-to-host count from 3 (in FIG. 6A) to 2 without introducing a new host, but by relocating satellite 200-1 in such a manner that it is still within the reach of host 100-1, but is now also in reach of satellite 200-4.

Thus, while there have been shown and described and pointed out fundamental novel features of the invention as applied to preferred embodiments thereof, it will be understood that various omissions and substitutions and changes in the form and details of the devices described and illustrated, and in their operation, and of the methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of configuring a wireless RF network, the network comprising a plurality of network nodes for communicating with other nodes, each node of the wireless RF network having a controller unit, a data store and a unique identifier, the method comprising the steps of:
    a) selecting at least one of the plurality of nodes to serve as a control node of the wireless RF network;
    b) providing the at least one selected control node with a unique host ID stored in a host ID register accessible to said selected control node;
    c) periodically detecting other nodes within the coverage area of each respective node of the plurality of nodes by sending an inquiry message;
    d) periodically updating the data store of each respective node of the plurality of nodes with addresses of detected nodes received from responses to the inquiry message by said detected nodes;
    e) storing the unique identifier of each respective node prescribed to pertain to the wireless RF network accessible to the at least one control node of the wireless RF network;
    f) transmitting from the at least one control node of the wireless RF network a dynamic paging message addressed to each respective node located within the coverage area of the at least one control node according to step (d) and having the unique identifier stored accessible to the at least one control node according to step (e);
    g) updating the data store of each respective node receiving the dynamic paging message and returning relative information of the updated data store to the at least one control node of the wireless RF network from each respective node receiving the dynamic paging message;
    h) storing the received relative information of the updated data store accessible to the at least one control node of the wireless RF network;
    i) transmitting from the at least one control node of the wireless RF network a message to each respective node which returned the relative information of the updated data store, the message instructing said node to send the dynamic paging message addressed to each respective node matching predefined criteria;
    j) repeating steps (g) to (i) until every node identified to the at least one control node according to step (e) has been paged.

2. The method of claim 1, wherein the predefined criteria are matched if the respective node to be paged is located within the coverage area of the node instructed to send the dynamic paging message and has a unique identifier stored accessible to the at least one control node, and if the respective node to be paged has not previously been paged.

3. The method of claim 1, wherein the dynamic paging message comprises the unique host ID of the at least one control node of the wireless RF network and a dynamic hops-to-host count.

4. The method of claim 3, wherein the dynamic hops-to-host count is dependent on the placement of each respective node receiving the dynamic paging message.

5. The method of claim 4, wherein the hops-to-host count is 1 when the node receiving the dynamic paging message is within the coverage area of the at least one control node of the wireless RF network, and the hops-to-host count is incremented by 1 each time a previously paged node is instructed to send the dynamic paging message to each respective node matching predefined criteria.

6. The method of claim 3, wherein the unique host ID is stored in a non-volatile host ID register of each respective node receiving the dynamic paging message.

7. The method of claim 1, wherein the wireless network is a short range RF network.

8. The method of claim 7, wherein the wireless network is a Bluetooth network.

9. The method of claim 1, wherein:
    if a node comprises at least two transceivers, the first transceiver to answer the dynamic paging message is designated as a slave transceiver of the RF network and least one of the other transceivers is designated as a master transceiver of the RF network, and each transceiver designated as a master does not answer the dynamic paging message.

10. The method of claim 9, wherein in step (c) detecting of other nodes is performed by the master.

11. The method of claim 1, wherein a node further includes a transceiver for communication with wireless terminals, whereby a wireless terminal in transmission range of a node may communicate with another wireless terminal in transmission range of a node.

12. The method of claim 1, wherein the control node further comprises a gateway to another network, whereby a wireless terminal in transmission range of a node may communicate with a terminal on said other network.

13. The method of claim 1, wherein a node not within a transmission range of a certain node communicates with the certain node by relaying through other of the nodes of the wireless RF network.

14. A method of configuring a wireless RF network, the network comprising a plurality of network nodes for communicating with other nodes, each node of the wireless RF network having a controller unit, a data store and a unique identifier, the method comprising the steps of:
   a) maintaining identification information including a unique identifier of each respective node of the plurality of nodes prescribed to pertain to the wireless RF network;
   b) periodically detecting other nodes within coverage area of each respective node of the plurality of nodes and updating the data store of the each respective node of the plurality of nodes with information received from the detected nodes;
   c) transmitting a dynamic paging message addressed to each respective node matching predefined criteria;
   d) storing relative information of the dynamic paging message within each respective node receiving the dynamic paging message and returning a response message to the dynamic paging message;
   e) repeating steps c) and d) until every node identified according to step a) has been paged.

15. The method of claim 14, wherein the predefined criteria are matched if the respective node to be paged is located within the coverage area of the transmitting node and having unique identifier stored accessible to the at least one node of the wireless RF network, and if the respective node to be paged has not previously been paged.

16. The method of claim 14, wherein the dynamic paging message comprises the unique host ID of the at least one control node of the wireless RF network and a dynamic hops-to-host count.

17. The method of claim 16, wherein the dynamic hops-to-host count is dependent on the placement of each respective node receiving the dynamic paging message.

18. The method of claim 17, wherein the hops-to-host count is 1 when the node receiving the dynamic paging message is within the coverage area of the at least one control node of the wireless RF network, and the hops-to-host count is incremented by 1 each time a previously paged node is instructed to send the dynamic paging message to each respective node matching predefined criteria.

19. The method of claim 16, wherein the unique host ID is stored in a non-volatile host ID register of each respective node receiving the paging message.

20. The method of claim 14, wherein the wireless network is a short range RF network.

21. The method of claim 20, wherein the wireless network is a Bluetooth network.

22. The method of claim 14, wherein:
   if a node comprises at least two transceivers, the first transceiver to answer the dynamic paging message is designated as a slave transceiver of the RF network and least one of the other transceivers is designated as a master transceiver of the RF network, and each transceiver designated as a master does not answer the dynamic paging message.

23. The method of claim 22, wherein in step (b) detecting of other nodes is performed by the master.

24. The method of claim 14, wherein a node further includes a transceiver for communication with wireless terminals, whereby a wireless terminal in transmission range of a node may communicate with another wireless terminal in transmission range of a node.

25. The method of claim 14, wherein the control node further comprises a gateway to another network, whereby a wireless terminal in transmission range of a node may communicate with a terminal on said other network.

26. The method of claim 14, wherein a node not within a transmission range of a certain node communicates with the certain node by relaying through other of the nodes of the wireless RF network.

27. A method of routing information while maintaining configuration of a wireless RF network, the network comprising a plurality of network nodes for communicating with other nodes, each respective node having a controller unit, a data store and a unique identifier, the method comprising the steps of:
   a) periodically sending a current data load information and a hops-to-host count from each respective node of the wireless RF network to other nodes within the coverage area of said respective node of the wireless RF network;
   b) periodically updating the data store of the each respective node of the wireless RF network with the data load information and the hops-to-host count of other nodes within the coverage area of said respective node of the wireless RF network;
   c) selecting at least one path having least hops-to-host count for routing messages from a node to at least one control node of the wireless RF network; and
   d) if more than one path having least hops-to-host count exists, selecting from among them a path with least load for routing messages from the node to the at least one control node of the wireless RF network.

28. The method of claim 27, wherein each node removes from its data store information pertaining to a node that does not report current load for a predetermined time, whereby a node that becomes non-functional is removed from the network configuration.

29. The method of claim 27, further comprising the steps of:
   sending a service discovery message from a transceiver of a certain node that has just been powered on, the message including the transceiver s unique address;
   receiving the service discovery message in a client interface transceiver of a network node and sending a message from the network node to the identified transceiver of the certain node, the message containing a handle of a network service accessible through the network node;
   registering the certain node in the data store of the network node, the registration including a hops-to-host count one greater than the network node's;
   sending a message to the certain node containing a number one greater than the network node's hops-to-host count, which number is recorded in the certain node as its hops-to-gateway count, and load information pertaining to the network node;

sending a message from the certain node to a control node reporting the certain node's unique transceiver address, hops-to-host count, and load information; and recording in the control node the information in the message from the certain node, whereby a former network node that was powered down, relocated, and powered up is reconfigured as a network node.

30. The method of claim 27, wherein the wireless network is a short range RF network.

31. The method of claim 30, wherein the wireless network is a Bluetooth network.

32. A wireless RF network comprising a plurality of network nodes for communicating with other nodes, each node of the wireless RF network having a controller unit, a data store and a unique identifier, wherein:
a) at least one of the plurality of nodes is selected to serve as a control node of the wireless RF network;
b) the at least one selected control node is provided with a unique host ID stored in a host ID register accessible to said selected control node;
c) an inquiry message is periodically sent to other nodes within the coverage area of each respective node of the plurality of nodes;
d) the data store of each respective node of the plurality of nodes is periodically updated with addresses of detected nodes received from responses to the inquiry message by said detected nodes;
e) the unique identifier of each respective node prescribed to pertain to the wireless RF network accessible to the at least one control node of the wireless RF network is stored;
f) a dynamic paging message is transmitted from the at least one control node of the wireless RF network addressed to each respective node located within the coverage area of the at least one control node and having the unique identifier stored accessible to the at least one control node;
g) each respective node receiving the dynamic paging message updates its data store and returns relative information of the updated data store to the at least one control node of the wireless RF network;
h) each respective node stores the received relative information of the updated data store accessible to the at least one control node of the wireless RF network;
i) the at least one control node of the wireless RF network transmits a message to each respective node which returned the relative information of the updated data store, the message instructing said node to send the dynamic paging message addressed to each respective node matching predefined criteria;
j) sending of the dynamic paging message is repeated until every node identified to the at least one control node has been paged.

33. The wireless RF network of claim 32, wherein the predefined criteria are matched if the respective node to be paged is located within the coverage area of the node instructed to send the dynamic paging message and has a unique identifier stored accessible to the at least one control node, and if the respective node to be paged has not previously been paged.

34. The wireless RF network of claim 32, wherein the dynamic paging message comprises the unique host ID of the at least one control node of the wireless RF network and a dynamic hops-to-host count.

35. The wireless RF network of claim 34, wherein the dynamic hops-to-host count is dependent on the placement of each respective node receiving the dynamic paging message.

36. The wireless RF network of claim 35, wherein the hops-to-host count is 1 when the node receiving the dynamic paging message is within the coverage area of the at least one control node of the wireless RF network, and the hops-to-host count is incremented by 1 each time a previously paged node is instructed to send the dynamic paging message to each respective node matching predefined criteria.

37. The wireless RF network of claim 34, wherein the unique host ID is stored in a non-volatile host ID register of each respective node receiving the paging message.

38. The wireless RF network of claim 32, wherein the wireless network is a short range RF network.

39. The wireless RF network of claim 38, wherein the wireless network is a Bluetooth network.

40. A wireless RF network, the network comprising a plurality of network nodes for communicating with other nodes, each node of the wireless RF network having a controller unit, a data store and a unique identifier, wherein:
a) identification information is maintained including a unique identifier of each respective node of the plurality of nodes prescribed to pertain to the wireless RF network;
b) other nodes within coverage area of each respective node of the plurality of nodes are detected and the data store of the each respective node of the plurality of nodes is updated with information received from the detected nodes;
c) a dynamic paging message is transmitted addressed to each respective node matching predefined criteria;
d) relative information of the dynamic paging message within each respective node receiving the dynamic paging message is stored and a response message to the dynamic paging message is returned;
e) transmitting of the dynamic paging message is repeated until every node identified has been paged.

41. The wireless RF network of claim 40, wherein the predefined criteria are matched if the respective node to be paged is located within the coverage area of the transmitting node and having unique identifier stored accessible to the at least one node of the wireless RF network, and if the respective node to be paged has not previously been paged.

42. The wireless RF network of claim 40, wherein the dynamic paging message comprises the unique host ID of the at least one control node of the wireless RF network and a dynamic hops-to-host count.

43. The wireless RF network of claim 42, wherein the dynamic hops-to-host count is dependent on the placement of each respective node receiving the dynamic paging message.

44. The wireless RF network of claim 43 wherein the hops-to-host count is 1 when the node receiving the dynamic paging message is within the coverage area of the at least one control node of the wireless RF network, and the hops-to-host count is incremented by 1 each time a previously paged node is instructed to send the dynamic paging message to each respective node matching predefined criteria.

45. The wireless RF network of claim 42, wherein the unique host ID is stored in a non-volatile host ID register of each respective node receiving the paging message.

46. The wireless RF network of claim 40, wherein the wireless network is a short range RF network.

47. The wireless RF network of claim 46, wherein the wireless network is a Bluetooth network.

48. A wireless RF network for routing information while maintaining configuration of a wireless RF network, the network comprising a plurality of network nodes for communicating with other nodes, each respective node having a controller unit, a data store and a unique identifier, wherein:
   a) current data load information and a hops-to-host count from each respective node of the wireless RF network are periodically sent to other nodes within the coverage area of said respective node of the wireless RF network;
   b) the data store of the each respective node of the wireless RF network is periodically updated with the data load information and the hops-to-host count of other nodes within the coverage area of said respective node of the wireless RF network;
   c) at least one path having least hops-to-host count for routing messages from a node to at least one control node of the wireless RF network is selected; and
   d) if more than one path having least hops-to-host count exists, a path with least load for routing messages from the node to the at least one control node of the wireless RF network is selected from among them.

49. The wireless RF network of claim 48, wherein each node removes from its data store information pertaining to a node that does not report current load for a predetermined time, whereby a node that becomes non-functional is removed from the network configuration.

50. The wireless RF network of claim 48, wherein:
   a service discovery message is sent from a transceiver of a certain node that has just been powered on, the message including the transceivers s unique address;
   the service discovery message is received in a client interface transceiver of a network node a message is sent from the network node to the identified transceiver of the certain node, the message containing a handle of a network service accessible through the network node;
   the certain node is registered in the data store of the network node, the registration including a hops-to-host count one greater than the network node's;
   a message is sent from the network node to the certain node containing a number one greater than the network node's hops-to-host count, which number is recorded in the certain node as its hops-to-gateway count, and load information pertaining to the network node;
   a message is sent from the certain node to a control node reporting the certain node's unique transceiver address, hops-to-host count, and load information; and
   in the control node the information in the message from the certain node is recorded, whereby a former network node that was powered down, relocated, and powered up is reconfigured as a network node.

51. A self-configuring wireless RF network, the network comprising:
   a plurality of nodes, each of the plurality of nodes comprising:
      a controller unit;
      a data store operatively connected to said controller unit;
      at least one transceiver operatively connected to said controller unit for communicating wirelessly with other nodes;
      a unique identifier;
      a means for detecting other nodes within a coverage area of the node;
      a neighbor database operatively connected to said data store for maintaining updateable information of the detected nodes within the coverage area of the node;
      a means for receiving a dynamic paging message addressed to the node and updating relative configuration information;
      a satellite list database operatively connected to said data store for maintaining updated information of all nodes configured to the wireless RF network; and
      a means for relaying the dynamic paging message addressed to each respective node prescribed to pertain to the wireless RF network based on matching a predefined criteria,
   wherein at least one of the plurality of nodes is selected to serve as a control node, the at least one control node further comprising:
      a unique host ID stored in a host ID register accessible to the at least one control node; and
      a node identifier storage accessible to the at least one control node including the unique identifiers of each of the plurality of nodes prescribed to pertain to the wireless RF network; and
      a means for transmitting the dynamic paging message addressed to each respective node prescribed to pertain to the wireless RF network based on matching a predefined criteria.

52. The network of claim 51, wherein the predefined criteria is matched if the respective node to be paged appears in the neighbor database accessible to the node transmitting the paging message and has the unique identifier of the node stored at the node identifier storage accessible to the at least one control node, and if the respective node to be paged has not previously been paged.

53. The network of claim 51, wherein the dynamic paging message comprises the unique host ID of the at least one control node of the wireless RF network and a dynamic hops-to-host count.

54. The network of claim 53, wherein the dynamic hops-to-host count is dependent on the placement of each respective node receiving the dynamic paging message.

55. The network of claim 54, wherein the hops-to-host count is 1 when the node receiving the dynamic paging message appears on the neighbor database of the at least one control node of the wireless RF network, and the hops-to-host count is incremented by 1 each time a previously paged node is instructed to send the dynamic paging message to each respective node matching predefined criteria.

56. The network of claim 53, wherein the unique host ID is stored in a non-volatile host ID register of each respective node receiving the dynamic paging message and the hops-to-host count is stored at the satellite list database connected to the data store.

57. The network of claim 51, wherein each node configured to the wireless RF network by receiving the dynamic paging message transmits relative information back to the at least control node.

58. The network of claim 57, wherein the relative information comprises relative content of the updated satellite list database and a list of nodes appearing on the nodes neighbor database.

59. The network of claim 51, wherein the wireless RF network is a short range RF network.

60. The network of claim 59, wherein the short range RF network is a Bluetooth network.

61. The network of claim 51, wherein:
   if a node comprises at least two transceivers, the first one to answer paging is designated as a slave transceiver of the RF network and least one of the other transceivers is designated as a master transceiver of the RF network, and each transceiver designated as a master does not answer paging.

62. The network of claim 61 wherein detecting of other nodes is performed by the master.

63. The network of claim 51, wherein a node further includes a transceiver for communication with wireless terminals, whereby a wireless terminal in transmission range of a node may communicate with another wireless terminal in transmission range of a node.

64. The network of claim 51, wherein the control node further comprises a gateway to another network, whereby a wireless terminal in transmission range of a node may communicate with a terminal on said other network.

65. The network of claim 51, wherein a node not within a transmission range of a certain node communicates with the certain node by relaying through other of the nodes of the wireless RF network.

66. A node for communicating with client devices and configuring a wireless RF network with others of a plurality of wireless nodes, said node comprising:
 a processor;
 at least one transceiver operatively connected to the processor and operatively arranged for communicating with at least one of the other wireless nodes in the RF network and the client devices;
 a memory operatively connected to said processor and including a host ID register and a satellite table, said host ID register storing a network ID of the node and said satellite table storing network configuration information including a list of nodes in the wireless RF network, the number of hops-to-host for each of the nodes, and a load of said each of said nodes; and
 said processor comprising a program implementation for performing the steps of:
 a) periodically detecting other nodes within the coverage area of the node by sending an inquiry message;
 b) periodically updating the satellite table of the node with addresses of detected nodes received from responses to the inquiry message by said detected nodes;
 c) storing the unique identifier of each respective detected node of the plurality of nodes prescribed to pertain to the wireless RF network accessible to the node of the wireless RF network;
 d) transmitting a dynamic paging message addressed to each respective detected node located within the coverage area of the node according to step (b) and having the unique identifier stored accessible to the node according to step (c);
 e) receiving, by the node, relative information of the updated satellite table from each respective detected node receiving the dynamic paging message;
 f) storing the received relative information of the updated satellite table accessible to the node of the wireless RF network; and
 g) transmitting from the node of the wireless RF network a message to each respective detected node which returned the relative information of the updated satellite table, the message instructing said each respective detected node to send the dynamic paging message addressed to each other node of the plurality of nodes matching predefined criteria.

67. A node for communicating with client devices and configuring a wireless RF network with other wireless nodes, said node comprising:
 a processor;
 at least one transceiver operatively connected to the processor and operatively arranged for communicating with at least one of the other wireless nodes in the RF network and the client devices;
 a memory operatively connected to said processor and including a host ID register and a satellite table, said host ID register storing a network ID of the node and said satellite table storing network configuration information including a list of nodes in said network, the number of hops-to-host for each of the nodes, and a load of said each of said nodes; and
 said processor comprising a program implementation for performing the steps of:
 a) maintaining identification information in the satellite table including a unique identifier of each respective node of the plurality of nodes prescribed to pertain to the wireless RF network;
 b) periodically detecting other nodes within coverage area of the node and updating the satellite table with information received from the detected nodes;
 c) transmitting a dynamic paging message addressed to each respective detected node matching predefined criteria;
 d) receiving a response message to the dynamic paging message.

68. A node for routing information while maintaining configuration of a wireless RF network with other wireless nodes, said node comprising:
 a processor;
 at least one transceiver operatively connected to the processor and operatively arranged for communicating with at least one of the other wireless nodes in the RF network and the client devices;
 a memory operatively connected to said processor and including a host ID register and a satellite table, said host ID register storing a network ID of the node and said satellite table storing network configuration information including a list of nodes in said network, the number of hops-to-host for each of the nodes, and a load of said each of said nodes; and
 said processor comprising a program implementation for performing the steps of:
 a) periodically sending a current data load information and a hops-to-host count to other nodes within the coverage area of said node of the wireless RF network;
 b) periodically updating the satellite table with data load information and the hops-to-host count of other nodes within the coverage area of said node of the wireless RF network;
 c) selecting at least one path having least hops-to-host count for routing messages from the node to at least one destination node of the wireless RF network; and
 d) if more than one path having least hops-to-host count exists, selecting from among them a path with least load for routing messages from the node to the at least one destination node of the wireless RF network.

* * * * *